United States Patent [19]
Antier et al.

[11] Patent Number: 5,124,821
[45] Date of Patent: Jun. 23, 1992

[54] LARGE-FIELD HOLOGRAPHIC BINOCULAR HELMET VISOR

[75] Inventors: Catherine Antier, Issy Les Moulineaux; Jean-Blaise Migozzi, Orsay, both of France

[73] Assignee: Thomson CSF, Paris, France

[21] Appl. No.: 526,679

[22] Filed: May 22, 1990

Related U.S. Application Data

[63] Continuation of Ser. No. 174,964, Mar. 29, 1988, abandoned.

[30] Foreign Application Priority Data

Mar. 31, 1987 [FR] France .............................. 87 04484

[51] Int. Cl.⁵ ..................... G02B 27/10; G02B 23/10; G02B 5/32
[52] U.S. Cl. ...................................... 359/14; 359/19; 359/630; 340/705
[58] Field of Search ............... 350/3.7, 174; 359/1, 359/13, 14, 630, 631, 632, 633, 19; 340/705

[56] References Cited

U.S. PATENT DOCUMENTS

| | | | |
|---|---|---|---|
| 3,923,370 | 12/1975 | Mostrom | 350/174 |
| 3,940,204 | 2/1976 | Withrington | 359/19 |
| 4,261,647 | 4/1981 | Ellis | 350/174 |

FOREIGN PATENT DOCUMENTS

| | | |
|---|---|---|
| 007039 | 1/1980 | European Pat. Off. |
| 077193 | 4/1983 | European Pat. Off. |
| 170523 | 2/1986 | European Pat. Off. |
| 0200022 | 11/1986 | European Pat. Off. |
| 0303742 | 2/1989 | European Pat. Off. |

OTHER PUBLICATIONS

Proceedings of the IEEE 1981 National Aerospace and Electronics Conference NAECON 1981, Dayton Convention Center, 19-21 May 1981, vol. 3, pp. 1261-1268, IEEE, Dayton Section Aerospace and Electronic Systems Society, New York, US; R. L. Berry et al.: "The Latirn wide field-of-view raster head ∝ up display".
Optical Engineering, vol. 24, No. 5, Sep./Oct. 1985, pp. 769-780, Society of Photo-Optical Instrumentation Engineers, Bellingham, US; J. R. Magarinos et al.: "Holographic mirrors".
Kogelnick, "Coupled Wave Theory for Thick Hologram Gratings", pp. 2909-2946, The Bell System Technical Journal, vol. 18, Nov. 1969, No. 9.
B. J. Chang, "Dichromated Gelatin Holograms and Their Applications", pp. 642-648 Optical Engineering 19(5), Sep./Oct. 1980.
B. J. Chang "Dichromated Gelatin for the Fabrication of Holographic Optical Elements", pp. 2407-2417, Applied Optics, vol. 18, No. 14, Jul. 15, 1979.

Primary Examiner—Bruce Y. Arnold
Assistant Examiner—David R. Parsons
Attorney, Agent, or Firm—Cushman, Darby & Cushman

[57] ABSTRACT

The visor makes it possible to obtain in binocular vision a large field of 60° in the vertical plane and 120° in the horizontal plane. In the case of each monocular vision channel, the visor is constituted by: an image generator such as a miniature cathode-ray tube, for example; an optical relay device; a collimation and combination optical system in which are grouped together a holographic mixing plate for transmitting the landscape channel and reflecting the image channel and a biconvex combining device formed by two holographic spherical optical elements employed on the axis for transmitting the two channels with collimation by diffraction of the image channel. A circular axial zone of zero photometric efficiency is produced in the case of each monocular vision channel and compensated by overlapping of the fields in binocular vision and, in a complementary manner, by the construction of mirror holograms providing variable index modulation.

6 Claims, 5 Drawing Sheets

LARGE-FIELD HOLOGRAPHIC BINOCULAR HELMET VISOR

This is a continuation of application No. 07/174,964, filed on Mar. 29, 1988, which was abandoned upon the filing hereof.

BACKGROUND OF THE INVENTION

The present invention relates to a large-field holographic binocular visor.

The term "visor" is understood to mean a device in which a collimated light image is observed in superimposition on a view of the external landscape. The light image corresponding to the data to be collimated is reflected at infinity by an optical collimating system. This results in absence of any effort of accommodation for the observer's eye and in substantial visual comfort. In the conventional manner, the light image is reflected toward the observer by a combination optical system. This optical system is traversed by the radiation received from the external landscape. Thus the observer such as an aircraft pilot sees a collimated light image superimposed on the landscape and corresponding, for example, to a synthetic image of navigation data.

Recent techniques in the field of high-head collimators are essentially directed to an increase in the instantaneous field of view of the collimated image as well as to the achievement of enhanced optical efficiency.

One known solution consists in making use of a spherical mirror on the axis, which also makes it possible to limit optical aberrations. In one design of this type as described in the French patent No. 2 542 459 (or U.S. Pat. No. 4,600,271), the optic axis of the spherical mirror corresponds to the normal axis of vision of the observer whose eye is placed at the center of the mirror. This mirror is combined with a semitransparent plane mirror which has the function of reflecting the optic axis from the light image generator toward the concave side of the spherical mirror which produces collimation and reflects the collimated image toward the observer. In order to increase the efficiency, a spherical holographic mirror is employed. This mirror reflects the wavelengths corresponding to the image generator which can consist of a cathode-ray tube display. The main disadvantage of this solution is that, although the circular field is enlarged, it nevertheless remains limited to values of the order of 30° to 40° in monocular vision. In order to obtain a larger field, it is necessary to adopt an off-axis arrangement of the spherical mirror since the partially transparent plane mirror is otherwise too close to the observer's eye. This results in optical aberrations and in difficulties in regard to practical utilization.

In accordance with another solution indicated in an article entitled "Holographic mirrors" and published in "Optical Engineering", Sep. Oct., 1985, Vol. 24, No. 5, pages 769-780, a semitransparent plane mirror is employed for reflecting the axis of the light-image generator toward the observer's eye. The corresponding radiation reflected from this mirror traverses a spherical mirror which is followed by a plane birefringent assembly perpendicular to the optic axis of the spherical mirror corresponding to the normal direction of vision. This birefringent assembly is adapted to cooperate with an upstream polarizer in order to polarize the radiation of the light image and permits subsequent recovery of the light image after collimation by the spherical mirror. A selection of the landscape channel and of the imaging channel is thus obtained as a function of their polarization. While this solution does permit an increase in the field which can attain 60° in the vertical direction and 135° in the horizontal direction in binocular vision (the monocular field being 80° circular), it is absolutely inefficient from the photometric point of view and presents problems when used in a real situation. In fact, transmission on the optical channel for landscape observation is below 10% and transmission on the channel for observation of the synthetic image is limited to approximately 1.6%. This results from the losses introduced in the mirrors at the time of multiple reflections and transmissions and from traversal of the polarizers. It is not possible to employ a hologram since the system is totally on the axis and the channels are not separable by holography.

SUMMARY OF THE INVENTION

The object of the invention is to overcome the disadvantages mentioned in the foregoing and to provide a display device with a field which is further enlarged and has a high power efficiency while constituting an ergonomic system. By way of indication, there can readily be obtained in accordance with the solution proposed hereinafter, and in binocular vision, a field of the order of 60° in elevation and approximately 120° in azimuth with efficiencies of the order of 40% in the case of the image channel and 30% in the case of the landscape channel.

It is another object of the invention to use the binocular visor in accordance with the invention as a helmet-mounted device.

The object aforesaid is achieved by providing a binocular visor constituted by two collimating devices each forming one monocular vision channel and comprising successively: a generator for producing a light image to be collimated, an optical relay-system device, and a collimation and combination optical assembly composed of an optical mixing element for transmitting the landscape channel and reflecting the image channel and followed by two optical collimating elements for transmitting the two channels with collimation of the image channel. The optical mixing element as well as the two optical collimating elements are each provided with a hologram. The optical mixing element is preferentially constituted by a holographic flat plate such that the hologram is of the mirror type which permits high transmission of the landscape channel in conjunction with optimum reflection of the image channel. The second optical collimating element is also spherical as in the case of the first but of lesser curvature and forms with said first element a biconvex assembly which is employed on the axis and placed downstream of the optical mixing element as considered in the direction of the optical path of the image channel. The holograms of the two optical collimating elements are made so as to ensure diffraction by reflection within a limited spectral band corresponding to that of the image channel.

DESCRIPTION OF THE PREFERRED EMBODIMENTS

The invention relates to a visor apparatus which can be mounted on a helmet and in which the binocular field can attain 60°×120°. The general arrangement of the apparatus under operating conditions is indicated in broad outline in FIG. 1. The visor is composed of two similar portions each designed for monocular vision and constituted successively by a generator 1A-1B for producing a light image to be collimated, an optical relay device 2A-2B and a collimation and combination optical assembly composed of a holographic optical mixing element 3A-3B and two holographic optical collimating elements 4A-4B.

The image can be formed by means of a miniature cathode-ray tube 1A-1B for each eye. The images can be either identical or different. The optical relay device 2A-2B is elbowed for reasons of size limitation by means of a prism structure, for example. The optical mixing element 3A-3B is formed by means of a flat plate which has the function of transmitting the external landscape channel and reflecting the image channel issuing from the cathode-ray tube. The flat plate has a hologram in order to increase the photometric efficiency in the cathode-ray tube channel by reflecting only the limited spectrum having a wavelength corresponding to the image channel and by transmitting all the other wavelengths of the visible spectrum without attenuation. The optical collimating element 4A-4B, hereinafter designated as a combiner, collimates at infinity the image which comes from the optical relay system and is reflected from the plate 3A-3B and transmits the light radiation of the landscape channel without modification.

Figure 2:
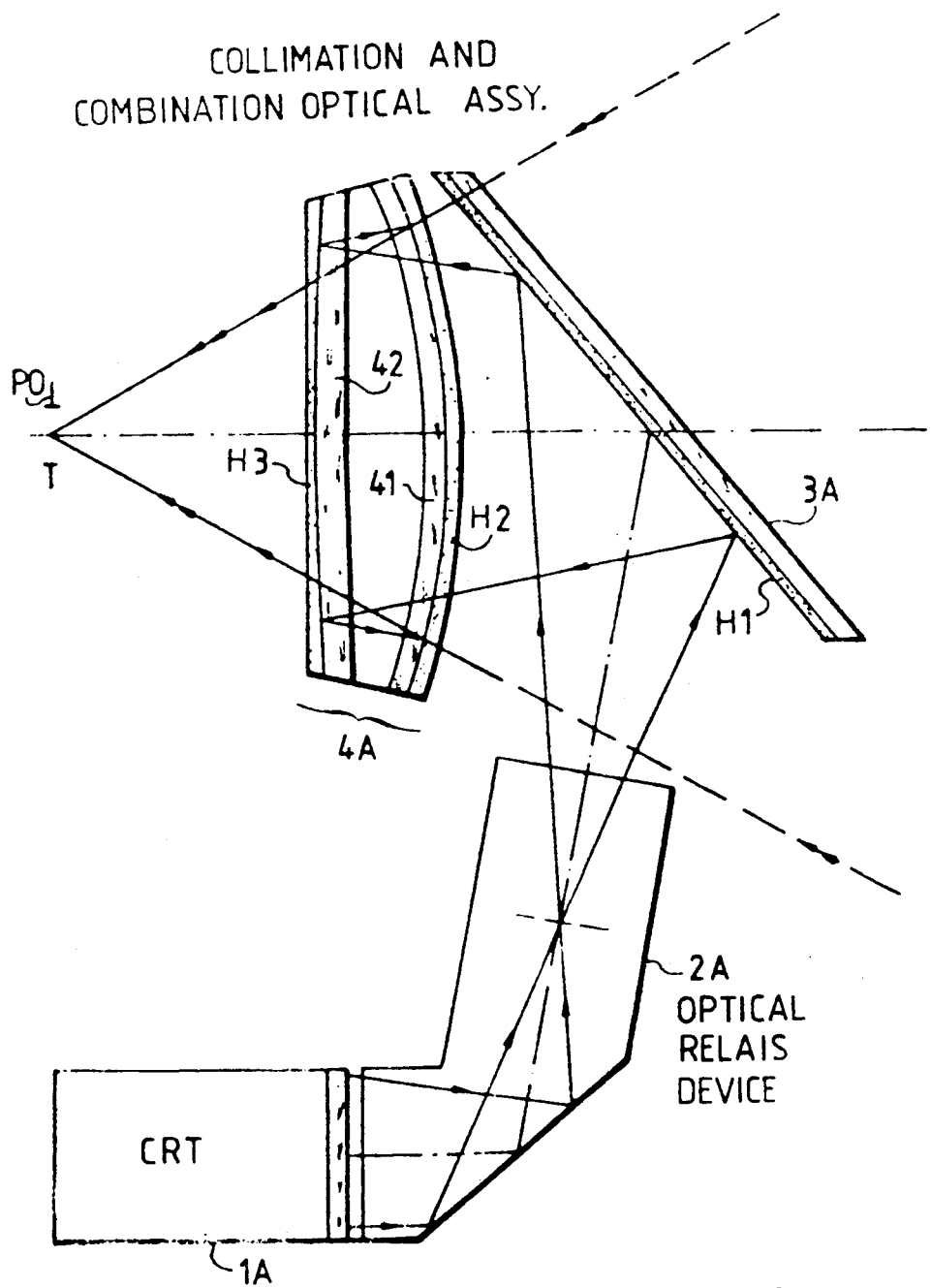
FIG. 2 is a general diagram of the elements of the visor shown in FIG. 1, these elements being employed in each monocular vision channel.

FIG. 2 shows the combination of the elements employed in monocular vision. In this simplified diagram are indicated three holograms H1, H2 and H3 placed respectively on the mixing plate 3A and on two optical elements 41 and 42 which constitute the combiner 4A. The optical element 41 has a spherical shape. The optical element 42 has a shape which is also spherical but is of lesser curvature. The assembly forms a biconvex optical system employed on the axis.

Figure 3:
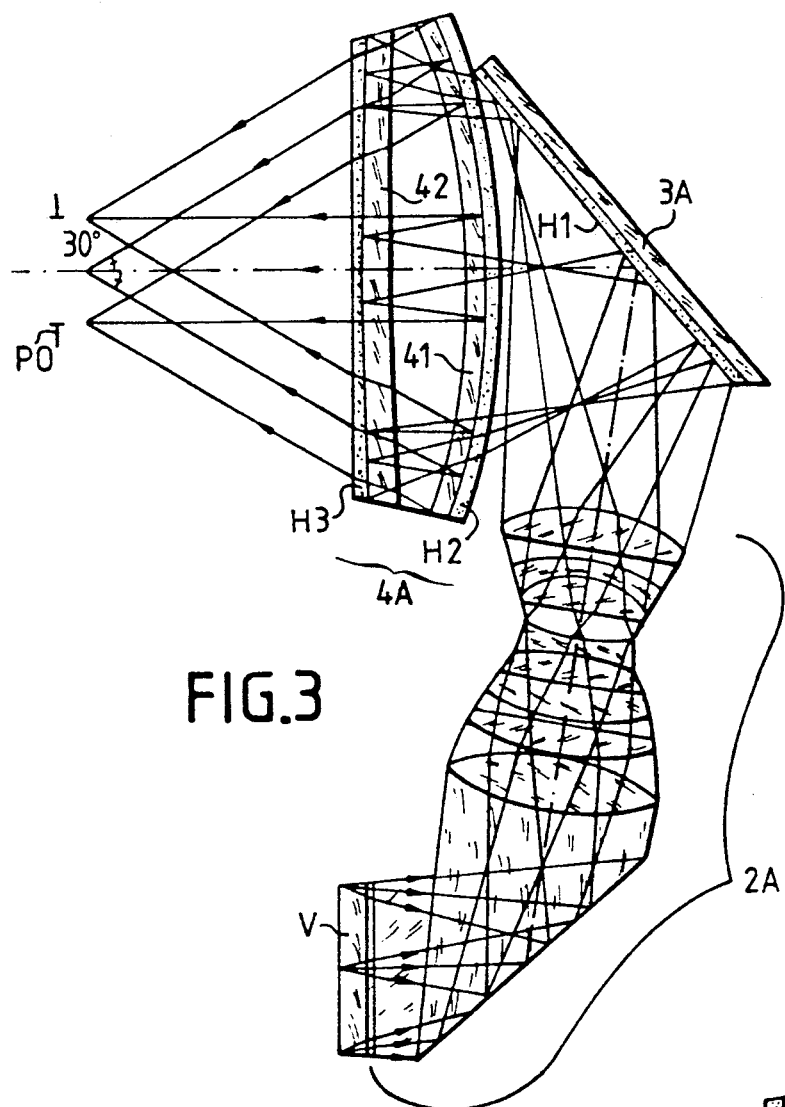
FIG. 3 is a detailed diagram of the optical path of the image channel of a monocular vision channel.
Figure 4:
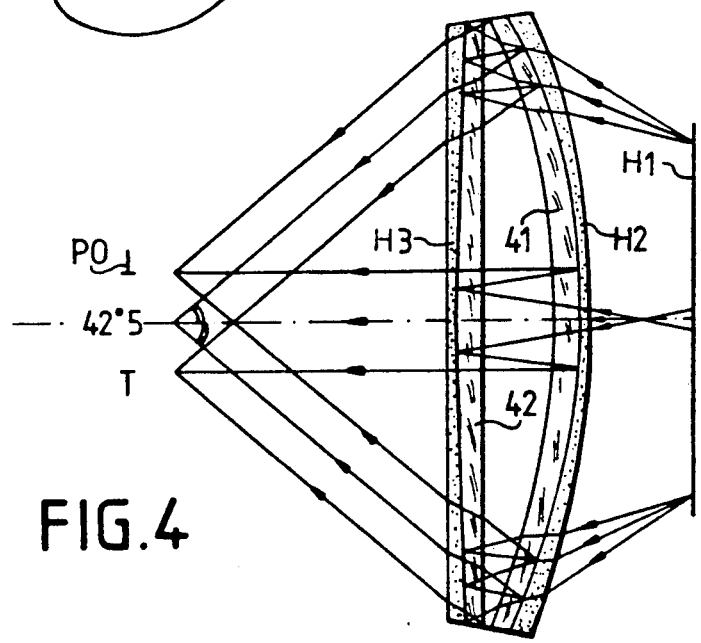
FIG. 4 is a top view of the partial diagram of FIG. 3 and serves to show the corresponding paths of travel of the rays in this plane.

FIGS. 3 and 4 illustrate the optical path of the image channel in respect of each monocular vision channel. The field rays are represented in respect of three directions, namely the axial direction and two directions which are symmetrical with respect to said axial direction. It is seen that the direction of the central axis or optic axis of the system does not undergo any collimation. This produces a zone of zero photometric efficiency and therefore a dark hole in the monocular field. This defect is compensated by overlapping of the fields in binocular vision, as will be seen at a later stage of the description. The pupil of the eye must be placed in the exit pupil $P_o$ of the optical relay system. The field in elevation as shown in FIG. 3A corresponds to ±30° and the field in azimuth which appears in the top view of FIG. 4 is ±42.5°, namely 85° in the lateral direction in respect of 60° in the vertical direction in monocular vision.

Figure 1:
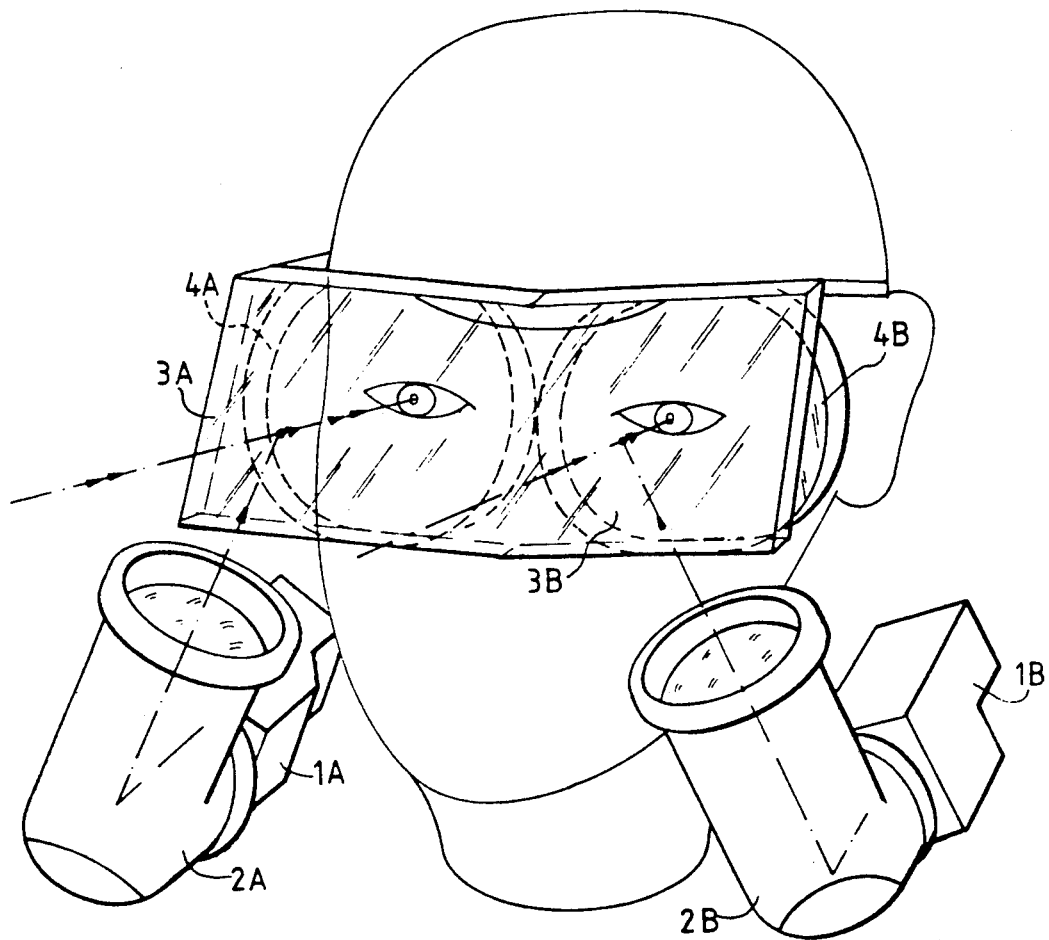
FIG. 1 is a perspective diagram of a binocular visor in accordance with the invention and worn by an observer.
Figure 5:
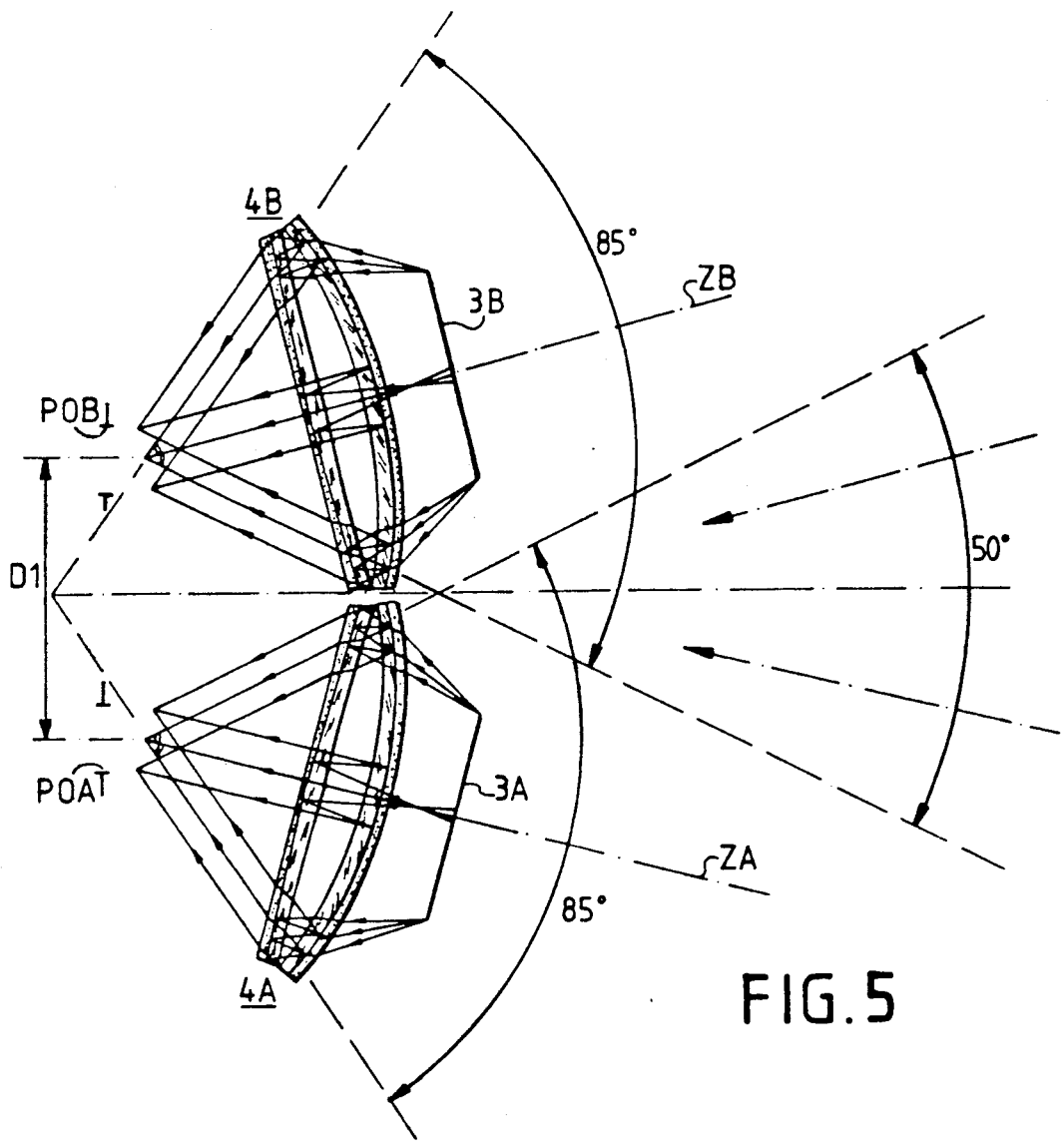
FIG. 5 is a schematic top view representing the binocular assembly and overlap of the fields.
Figure 6:
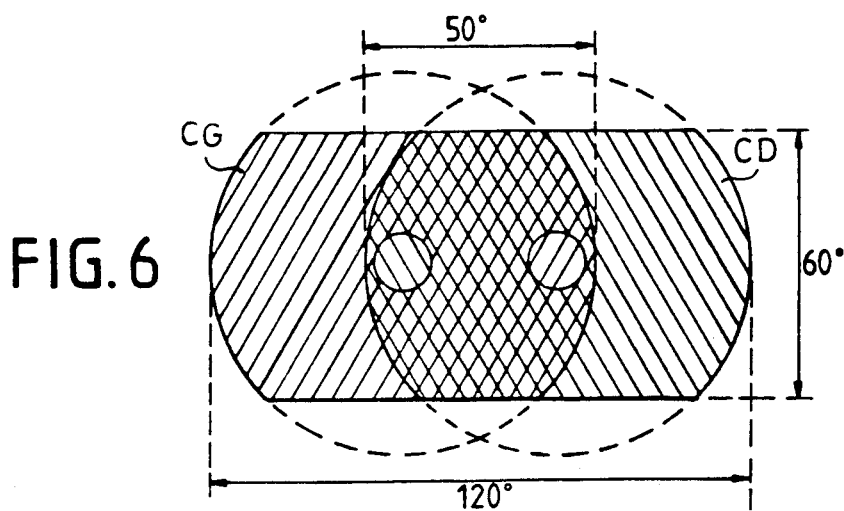
FIG. 6 is a diagram corresponding to that of FIG. 5 and serves to illustrate the overlap of each zone of zero photometric efficiency by the other monocular field respectively.

FIG. 5 illustrates the overlap of the fields in binocular vision, the eyes being at a distance D1 of the order of 6.5 cm, the optical collimating elements 4A-4B being arranged as shown and inclined with respect to each other at an angle which ensures the desired overlap, for example 50° in the embodiment considered so as to cover the axial dark hole relative to the monocular vision of the other eye as illustrated in FIG. 6. The left and right monocular fields of circular shape are designated in the figure by the references CG and CD. The shape which is truncated in height results from the size and dimensions of the mixing plates 3A-3B placed upstream (as shown in FIG. 1).

The optical characteristics of the visor are as follows in the case of the embodiment considered:

circular monocular field: 85°,
binocular field: 60° in the vertical plane and 120° in the horizontal plane,
exit pupil $P_o$ considered: 15 mm in diameter,
efficiency on the image channel or cathode-ray tube channel: 40%,
efficiency on the landscape channel: 30%,
diameter of the spot on the image channel: approximately 1.5 mrd at the center of the monocular field to approximately 3.5 mrd at 40°.

The visor in accordance with the invention has high photometric efficiency both on the image channel and on the landscape channel. This distinct improvement essentially results from the use of the holographic collimating combiner 4A-4B.

The holographic combiner 4A-4B behaves as an afocal system on the landscape channel, namely the channel corresponding to external vision. On the image channel, its focal distance is determined by dimensional considerations. Aberrations on the image channel and distortion on the landscape channel are minimized. Photometric efficiencies on the two channels are maximized as well as the diameter of the pupil or eye-box $P_o$.

The structural design of the combiner is apparent from FIGS. 3 and 4. The combiner is constituted by two holograms which diffract by reflection. The rays which emanate from the image-generating tube and therefore correspond to a fixed wavelength or to a very narrow spectral band are transmitted by the hologram H2, then diffracted by reflection by the hologram H3, then diffracted by reflection by the hologram H2, and finally transmitted by the hologram H3. This is made possible by the fact that the hologram is an optical component which, at a fixed wavelength, diffracts the rays which fall at a given angle of incidence and transmits without transformation the radiation which falls at the other angles of incidence. The rays originating from the landscape which contain the wavelengths of the visible spectrum are transmitted by the hologram H2, then by the hologram H3. This is due to the fact that, at a fixed angle of incidence, a hologram diffracts only those rays which have a fixed wavelength and transmits the rays of the other wavelengths without transformation. Thus the visible spectrum is practically entirely transmitted, with the exception of the narrow spectrum assigned to diffraction of the image channel.

On the image channel, at the center of each monocular field, the zone of zero photometric efficiency creates a hole in the field approximately 14° in diameter. The use in binocular vision with the field overlap indicated in FIGS. 5 and 6 provides a remedy for these two zero-efficiency holes. Moreover, in order to increase the photometric efficiency of the combiner on the pupil, index modulation of each of the two holograms H2 and H3 can be made variable according to the point considered on these holograms. The holograms H2 and H3 are of the mirror type or in other words produce action only as interferential filters. The optical characteristics of a hologram of this type are equal to those of its support. The mirror hologram is constructed in known manner by placing the layer of photosensitive material to be recorded between a glass plate which constitutes its support and a recording mirror having the same curvature. An index-adapting liquid can be provided between the photosensitive material and the mirror.

Figure 7:
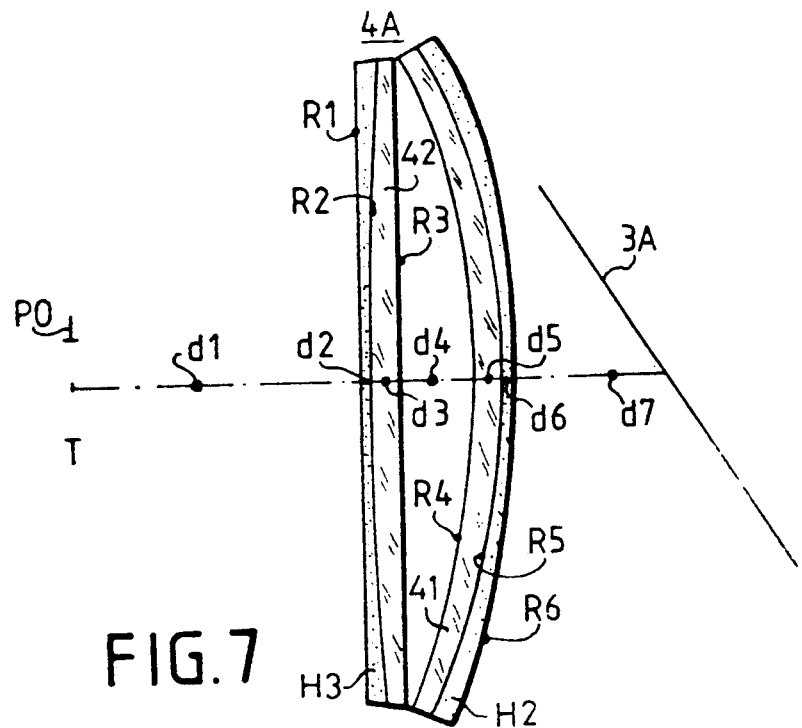
FIG. 7 is a diagram of the holographic optical collimating portion relating to one embodiment.

FIG. 7 indicates the parameters to be considered for one example of construction of the combiner. These parameters are the radii of curvature R1 to R6 and the positions on the optic axis d1 to d7 of the different plates of the combiner, that is, the supports 41 and 42 of glass or transparent material, and the holograms H2 and H3. The distance d1 corresponds to the distance between the exit pupil $P_o$ and the hologram H3. Similarly, the distance d7 represents the distance between the hologram H2 and the mixing plate 3A. The positions d1 to d7 are successively axial. They are indicated hereunder together with the radii R1 to R6, the dimensions being in millimeters:

| | |
|---|---|
| $d_1 = 38$ | $R_1 = 3100$ |
| $d_2 = 1$ | $R_2 = 530$ |
| $d_3 = 4$ | $R_3 = 6000$ |
| $d_4 = 10$ | $R_4 = 100$ |
| $d_5 = 4$ | $R_5 = 93$ |
| $d_6 = 1$ | $R_6 = 110$ |
| $d_7 = 20$ | |

The holographic flat plate 3A or 3B has the function of mixing between the landscape channel and the cathode-ray tube channel. The hologram employed is also of the mirror type. The plate is inclined with respect to the axis of the combiner, for example at an angle of 40° to 45°.

Figure 8:
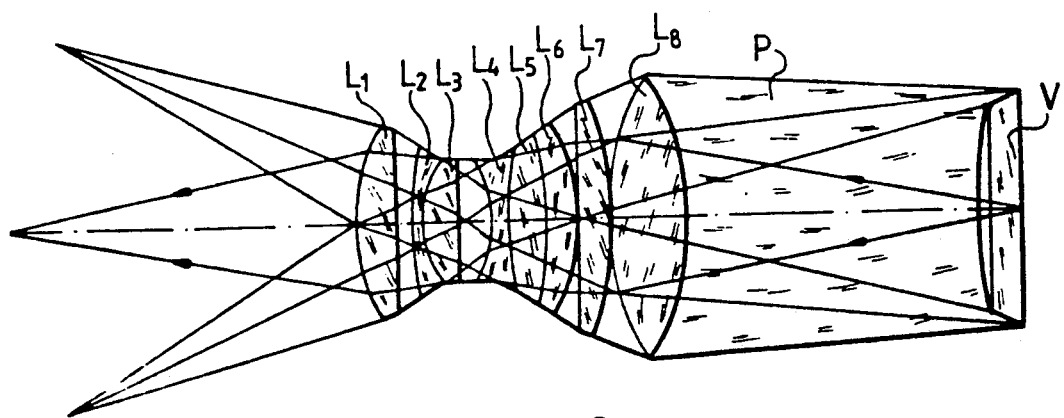
FIG. 8 is a diagram relating to one embodiment of the optical relay system.

FIG. 8 is a developed view of the optical relay device 2A which has already been shown in detail in FIG. 3 and which serves to transfer the image from the cathode-ray tube 1A to the combiner 4A after reflection from the holographic flat plate 3A. This optical system compensates for residual aberrations of the combiner. In the proposed design, this system is composed of an assembly of eight lenses and one prism. The first element L1 constitutes a convergent meniscus lens. This is followed by a doublet L2, L3 formed by a divergent meniscus lens and a convergent meniscus lens assembled together. Next in the series is a triplet L4, L5, L6 made up of a biconcave lens L4, a biconvex lens L5 and a convergent meniscus lens L6. The element L7 is a convergent meniscus lens and the element L8 is a biconvex lens. The end prism P permits the return of the optical path and terminates at one end in a curved face which is applied in accurately fitting relation with the corresponding spherical optical surface of the lens L8 and at the other end in a curved face located in front of the screen of the cathode-ray tube, the thickness of glass of said tube being represented in the figure by the terminal component V.

The proposed binocular visor permits a large field of view and can be mounted on a helmet. The essential applications contemplated consist in providing an aid to navigation for aircraft or helicopter pilots as well as simulation of navigation.

The image generator 1A or 1B can be designed differently with a liquid-crystal matrix, for example.

What is claimed is:

1. A binocular helmet visor constituted by two collimating devices each forming one monocular vision channel and comprising successively:
   a generator for producing a light image to be collimated along an image channel;
   an optical relay-device;
   a collimation and combination optical assembly composed of an optical mixing element, comprising a plate, for transmitting a landscape channel and reflecting the image channel and followed by a combiner constituted by two optical elements with collimation of the image channel; said mixing element as well as the two optical combiner elements being each provided with a hologram, said optical elements being spherical and forming a biconvex assembly employed on the axis and placed downstream of the optical mixing element.

2. A visor according to claim 1, wherein the hologram of the optical mixing element is so determined as to ensure optimum transmission of a visible spectrum of the landscape channel and optimum reflection in a limited spectral band corresponding to the spectral band of the image channel and wherein the holograms of the optical combiner elements produce diffraction by reflection within the limited spectral band corresponding to the image channel and substantially integral transmission of the visible spectrum of the landscape channel.

3. A visor according to claim 2, wherein the radiation of the image channel is reflected by the optical mixing element, then transmitted by a first hologram of the combiner, diffracted by a second hologram of the combiner, again diffracted by the first hologram of the combiner, and finally transmitted by the second hologram of the combiner to the observer with the exception of the axial radiation which produces a zone of zero photometric efficiency.

4. A visor according to claim 3, wherein the combiner is constituted by supports of transparent material and said first and second holograms having positions, axial thicknesses and radii of curvature as given below and expressed in millimeters:

| | |
|---|---|
| $d_1 = 38$ | $R_1 = 3100$ (H3) |
| $d_2 = 1$ (H3) | $R_2 = 530$ (H3-42) |
| $d_3 = 4$ (42) | $R_3 = 6000$ (42) |
| $d_4 = 10$ | $R_4 = 100$ (41) |
| $d_5 = 4$ (41) | $R_5 = 93$ (41-H2) |
| $d_6 = 1$ (H2) | $R_6 = 110$ (H2) |
| $d_7 = 20$ | | d1 being the position of the first hologram with respect to the viewing pupil and d7 being the position of said second hologram with respect to the mixing plate.

5. A visor according to claim 1, wherein the combiners are angularly displaced so as to produce field overlaps which eliminate the effect of non-collimated axial radiation in each field of monocular vision.

6. A visor according to claim 1, wherein the holograms are of the mirror type.

* * * * *